J. W. GIBBONS.
MEASURING DEVICE.
APPLICATION FILED MAY 16, 1917.

1,269,595.

Patented June 18, 1918.

Inventor:
James W. Gibbons,
by his attorney, Charles V. Gooding

UNITED STATES PATENT OFFICE.

JAMES W. GIBBONS, OF BOSTON, MASSACHUSETTS.

MEASURING DEVICE.

1,269,595.
Specification of Letters Patent.
Patented June 18, 1918.

Application filed May 16, 1917. Serial No. 169,080.

*To all whom it may concern:*

Be it known that I, JAMES W. GIBBONS, a citizen of the United States, residing at Roxbury, Boston, in the county of Suffolk and State of Massachusetts, have invented new and useful Improvements in Measuring Devices, Case B, of which the following is a specification.

This invention relates to a measuring device which is particularly adapted to be used in restaurants known as "cafeteria" restaurants where the patrons help themselves to food and placing it on a tray then receive a cup of coffee or tea and help themselves to sugar for the coffee or tea. The tray containing the food being held in one hand, it is impossible to put the sugar in the coffee or tea without setting down the tray, and according to the present arrangement the patron is obliged to put down the tray and help himself to sugar for his coffee or tea.

It is the object of this invention to make it possible for the patron to hold the tray in one hand and with his cup of coffee in the other press against a certain portion of the measuring device of this invention and receive a certain amount of sugar which will be guided into the cup as it is held against the measuring device.

Another object of this invention is to provide a device of the character set forth in which the sugar or other material to be measured will be kept dry and this result is attained by making the walls of the hopper or container of two thicknesses with an air chamber between, and also the chutes leading from the hopper have the walls thereof made of two thicknesses, with an air chamber therebetween, and the same is true of the valves by which the measuring is accomplished. The air chamber between the double walls of the hopper, the chutes and the valves prevents the condensation of moisture upon the walls of the hopper and chutes and upon the valves so that the sugar remains dry and will feed freely. Otherwise, it would become moist and harden into lumps, which would prevent the same from feeding freely.

The invention consists in the combination and arrangement of parts set forth in the following specification and particularly pointed out in the claims thereof.

Referring to the drawings.

Like numerals refer to like parts throughout the several views of the drawings.

Figure 1:
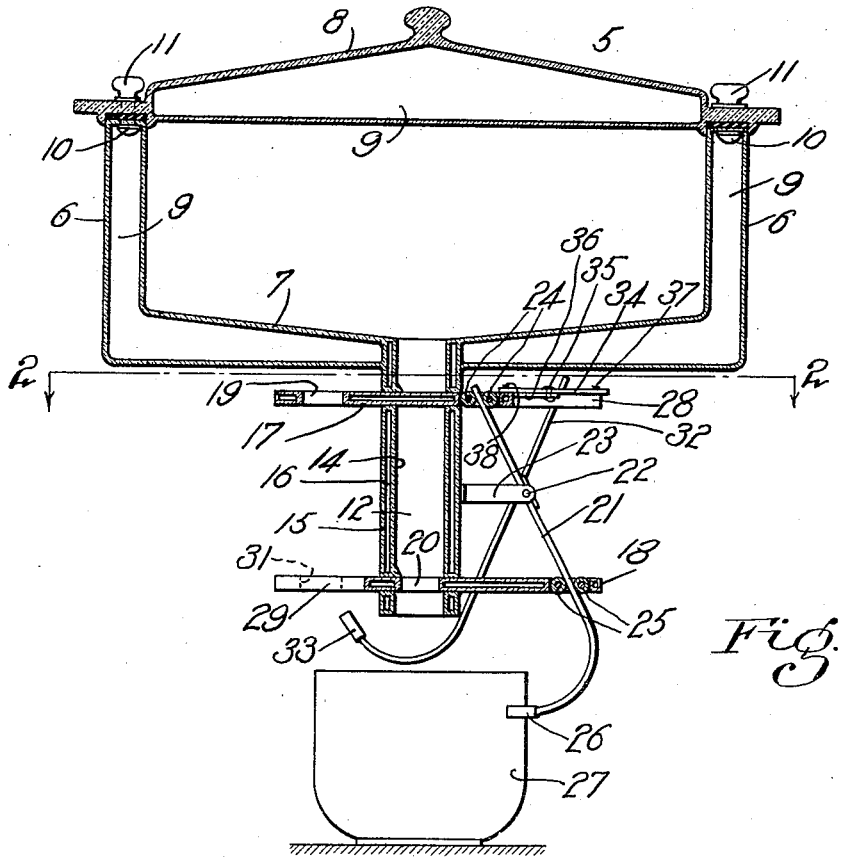
Figure 1 is a sectional elevation of my improved measuring device, taken on line 1—1, Fig. 2.

In the drawings, 5 is a hopper adapted to contain sugar or other material. 6 are the side walls of said hopper, 7 the bottom and 8 the top. It will be seen that the side walls, the bottom and the top of said hopper are made of two partitions or thicknesses and that these partitions have an air chamber therebetween. The top 8 is fastened to the body portion of the hopper by means of bolts 10 and thumb-screws 11.

12 and 13 are chutes leading downwardly from the interior of the hopper 5 and said chutes are formed with an inner wall 14 and an outer wall 15, and between said inner and outer walls is an air chamber 16.

The chute 12 has two slides 17 and 18, constituting valves, extending transversely thereof. The upper slide 17 has a hole 19 therein and the lower slide 18 has a hole 20 extending therethrough. These slides are so arranged and proportioned that when the slide 17 is moved a portion of its throw the holes 19 and 20 will be in alinement with each other and out of alinement with the chute 12. Said slides are moved simultaneously in opposite directions by means of a lever 21, pivoted at 22 to a bracket 23 fast to the chute 12. The upper end of said lever projects between rolls 24 journaled to rotate on the slide 17; the lower end of said lever projects between rolls 25 journaled on the slide 18, and said lever 21 is extended downwardly from the slide 18 and terminates at its lower end in a plate 26 which forms a convenient contact plate against which the cup 27 is pushed when it is desired to obtain a supply of sugar therein.

The chute 13 is also provided with two slides 28 and 29, one above the other, extending transversely thereof. The slide 28 has a hole 30 therein and the slide 29 has a hole 31 therein. A lever 32 connects the two slides 28 and 29 in a similar manner to that in which the lever 21 connects the slides 17 and 18 to each other. Said lever 32 is pivoted at 22 and terminates at its lower end in a contact plate 33. A lever 34 pivoted at 35 to a bracket 36 fast to the chutes 12 and 13 engages pins 37 and 38 fast to the slides 28 and 17, respectively, so that when the slide 17 is moved in one direction the slide 28 will be moved in the opposite direction by reason of the lever 34 connecting the two slides 17 and 28.

The general operation of the device hereinbefore specifically described is as follows: The user takes the cup 27 and, placing it against the contact plate 26, pushes the lever 21 backwardly into the position illustrated in Fig. 1. In doing this the slide 18, by means of its opening 20, opens the chute 12 to allow the sugar contained between the walls 18 and 17 to flow out and into the cup 27. At this time the sugar is entering the chute 13 through the hole 30 in the slide 28, the slide 29 being in a position to close said chute.

Figure 2:
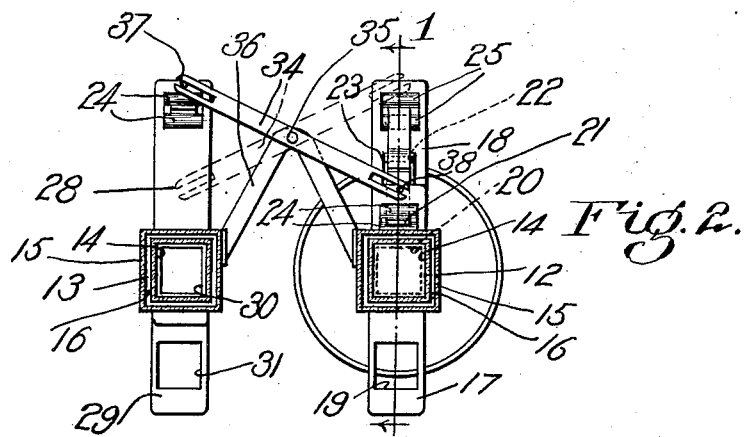
Fig. 2 is a sectional plan taken on line 2—2 of Fig. 1.

The next user of the device places his cup against the contact plate 33 and tips the lever 32 so as to reverse the position of the slides in the chutes 12 and 13—that is, the slide 29 will be pushed backwardly, which, through the lever 32, will move the slide 28 forwardly, and thus the hole 30 will be moved out of alinement with the chute 13, and any further sugar will be cut off from entering the chute 13 from the hopper, while the hole 31 in the slide 29 will be brought into alinement with the chute and the sugar in said chute below the slide 28 will flow down the chute and through the hole 31 into the cup. At the same time that the slide 29 is moved backwardly as hereinbefore described, the lever 34 will be tipped from the position shown in full lines (Fig. 2) to the position shown in dotted lines, and thus the slide 17 will be moved backwardly, and through the lever 21 the slide 18 will be moved forwardly which will open the chute 12 into the hopper through the hole 19 and which will close said chute at its lower end by means of the slide 18, the opening 20 thereof having been moved out of alinement with the chute 12.

Thus alternately a cup may receive sugar from the chutes 12 and 13, and it will be noted that the movement of the slides relatively to each other is a positive one.

Having thus described my invention, what I claim and desire by Letters Patent to secure is:—

1. A measuring device having, in combination, a pair of chutes, two valves slidably mounted in each of said chutes, one above the other, each of said valves having a hole therethrough, means adapted to simultaneously move said slide valves and to move the slide valves in each chute in opposite directions, all the holes in said valves being adapted to be moved out of alinement with said chutes at the same time.

2. A measuring device having, in combination, a pair of chutes, two valves slidably mounted in each of said chutes, one above the other, each of said valves having a hole therethrough, means adapted to simultaneously move said slide valves and to move the slide valves in each chute in opposite directions, the holes in each of the slides in the same chute being adapted to be brought alternately into alinement with said chute.

3. A measuring device having, in combination, a pair of chutes, two valves slidably mounted in each of said chutes, one above the other, each of said valves having a hole therethrough, means adapted to simultaneously move said slide valves and to move the slide valves in each chute in opposite directions, the holes in said slides being so arranged that the hole in the upper slide of one chute and the hole in the lower side of the other chute are in alinement with their respective chutes at the same time.

4. A measuring device having, in combination, a pair of chutes, two valves slidably mounted in each of said chutes, one above the other, each of said valves having a hole therethrough, means adapted to simultaneously move said slide valves and to move the slide valves in each chute in opposite directions, the holes in said slides being so arranged that the holes in the two slides of each chute are arranged to move alternately into and out of alinement with their respective chutes, and that when a hole in the upper slide of one chute is in alinement therewith the hole in the upper slide of the other chute will be out of alinement therewith.

5. A measuring device having, in combination, a pair of chutes, two valves slidably mounted in each of said chutes, one above the other, each of said valves having a hole therethrough, a lever pivoted to each of said chutes and connected on opposite sides of its pivot to the valves of its respective chute, and a third lever connecting the valve of one chute to the corresponding valve of the other chute and a pivot for said lever located between said valves, all the holes in said valves being adapted to be moved out of alinement with said chutes at the same time.

6. A measuring device having, in combination, a pair of chutes, two valves slidably mounted in each of said chutes, one above the other, each of said valves having a hole therethrough, a lever pivoted to each of said chutes and connected on opposite sides of its pivot to the valves of its respective chute, a third lever connecting the valve of one chute to the corresponding valve of the other chute and a pivot for said lever located between said valves, the holes in said slides being so arranged that the hole in the upper slide of one chute and the hole in the lower slide of the other chute are in alinement with their respective chutes at the same time.

In testimony whereof I have hereunto set my hand in presence of two subscribing witnesses.

JAMES W. GIBBONS.

Witnesses:
SYDNEY E. TAFT,
HATTIE E. STRATTON.

Copies of this patent may be obtained for five cents each, by addressing the "Commissioner of Patents, Washington, D. C."